No. 635,187. Patented Oct. 17, 1899.
D. S. RICE.
STREET LAMP.
(Application filed Apr. 6, 1899.)
(No Model.) 2 Sheets—Sheet 1.

No. 635,187. Patented Oct. 17, 1899.
D. S. RICE.
STREET LAMP.
(Application filed Apr. 6, 1899)
(No Model.) 2 Sheets—Sheet 2.

UNITED STATES PATENT OFFICE.

DAVID SHELDON RICE, OF MEMPHIS, TENNESSEE.

STREET-LAMP.

SPECIFICATION forming part of Letters Patent No. 635,187, dated October 17, 1899.

Application filed April 6, 1899. Serial No. 711,960. (No model.)

*To all whom it may concern:*

Be it known that I, DAVID SHELDON RICE, a citizen of the United States, residing at Memphis, in the county of Shelby and State of Tennessee, have invented certain new and useful Improvements in Street-Lamps; and I do hereby declare the following to be a full, clear, and exact description of the invention, such as will enable others skilled in the art to which it appertains to make and use the same.

My invention relates to improvements in street-lamps for burning liquid hydrocarbons in connection with an incandescent mantle; and it consists in the novel features hereinafter described and claimed.

My invention will be understood by reference to the accompanying drawings, wherein the same parts are indicated by the same letters throughout the several views.

Figure 1:
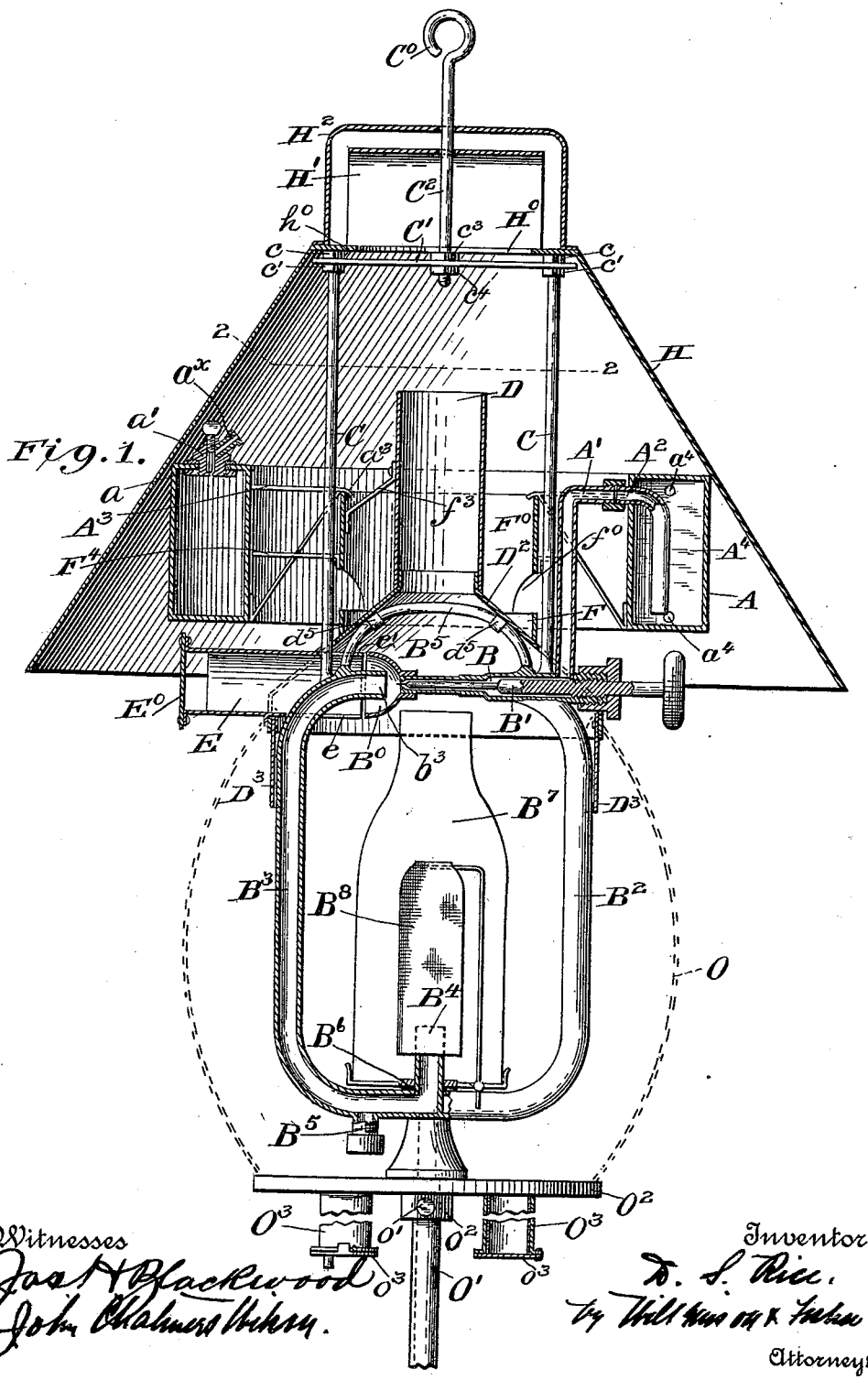
Figure 2:
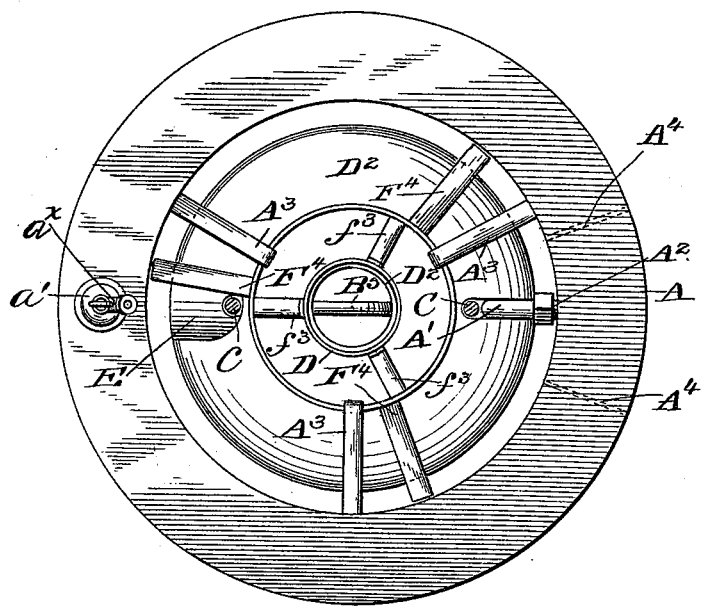
Figure 3:
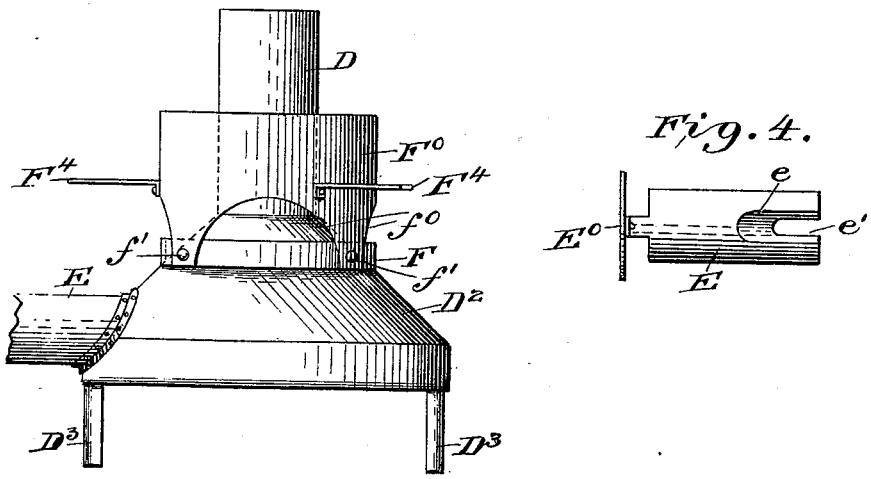
Figure 4:
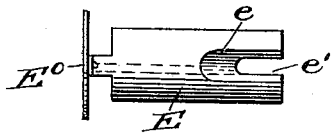

Figure 1 represents a central vertical section of a vapor-lamp provided with my invention. Fig. 2 is a section taken on the line 2 2 in Fig. 1 and looking down, the cover being removed. Fig. 3 represents a detail elevation of the chimney-tube detached; and Fig. 4 represents a detail view of the draft-tube for conducting air to the mixing-cup, the same being detached and seen as from the under side.

A represents the oil-tank, which is of an annular form and is provided with a filling-opening $a$, fitted with a screw-plug $a'$, having a needle-valve thereon and a connection $a^x$ for a tube for blowing air into said tank to create a flow of the oil therefrom. The tank A is fitted with an outlet-pipe $A^2$, which extends outside of the tank at its inner side at or near the top, as seen in Fig. 1, and to this outlet is connected a tube $A'$, which leads downwardly to and connects with the vaporizing-tube B, fitted with a needle-valve $B'$. The outlet-pipe $A^2$ within the tank extends to within a short distance of the bottom of the tank, and the pipe $A'$ being somewhat longer a siphoning effect is produced when air is forced into the tank through the valve-plug $a'$, as above described.

Partitions $A^4$ $A^4$, one of which is seen in elevation in Fig. 1 and both of which are indicated by dotted lines in Fig. 2, are fixed within the tank A upon opposite sides of the outlet-pipe $A^2$, and form a small chamber inclosing said tube to equalize the flow of oil therethrough as the lamp swings bodily in a heavy wind, the said partitions being provided with a plurality of small openings $a^4$ $a^4$, through which the oil may circulate under sufficient restraint to prevent the oil rising or falling too rapidly in said chamber.

The vaporizing-tube B is mounted in a horizontal position upon the upper end of the tubular standard $B^2$, the latter, however, having no internal connection with said vaporizing-tube, but serving merely as a support therefor. The foot of the tubular standard $B^2$ is turned to a horizontal position and rigidly connected with a similarly-shaped tube $B^3$, the latter having its inwardly-curved upper end $b^3$ opposite the discharge end of the vaporizing-tube B and extending within the cup $B^0$, mounted over the said discharge end of the vaporizing-tube. The foot of the tube $B^3$, which is turned to a horizontal position and rigidly connected to the foot of the tubular standard $B^2$, is closed against connection with said tubular standard and connects with a short vertical tube $B^4$, which serves as a burner-tube. The vapor-tube $B^3$ is preferably provided with a drain $B^5$ for drawing off any oil that may accumulate therein.

From the foregoing it will be seen that while the tubular standard $B^2$ and the vapor-tube $B^3$ are rigidly connected at their lower ends they are not connected at their upper ends. As these tubular standards constitute the foundation-frame of the lamp and are subject to more or less strain, an arched brace $B^5$, spanning the vaporizing-tube and having its ends rigidly connected to the said tubular standards $B^2$ and $B^3$, is provided to give greater rigidity to the said frame.

A chimney-gallery $B^6$, carrying a glass chimney $B^7$, is fitted over the burner-tube $B^4$ and supported thereby. The top of the chimney comes directly beneath the vaporizing-tube B and will direct the heat of the flame thereto, thus warming the oil and causing more rapid vaporization thereof. The burner-tube is also fitted with a mantle $B^8$, supported upon the chimney-gallery in the usual way. Thus when the vapor escaping from the burner-tube $B^4$ is ignited a blue flame of great heat but of small illuminating qualities will be produced, and this flame heats the mantle $B^8$ to incandescence, producing the desired effect of good illumination.

C C represent a pair of vertical rods rigidly connected at their lower ends to the tubular standards $B^2$ and $B^3$, and extending to some distance above are provided with screw-threaded ends fitted with a double set of nuts $c$ and $c'$. A cross-piece $C'$ fits over the ends of said rods and abuts against the nuts $c\ c$, being secured by the nuts $c'\ c'$.

$C^2$ represents a rod having a screw-threaded lower end which passes through an opening midway the length of the cross-piece and is fitted with nuts $c^3$ and $c^4$, by means of which the said rod is secured in said cross-piece. The upper end of this rod is provided with a loop or eye $C^0$ for engagement by a hook or other support (not shown) from which the lamp is to be suspended.

D represents a chimney-tube having a flaring base $D^2$, which extends over the vaporizing-tube B and the upper ends of the tubular standard $B^2$ and vapor-feed tube $B^3$. This flaring base of the chimney-tube rests upon the arched brace $B^5$ and is provided with a pair of clips $d^5$, which engage the said arched brace and retain the chimney-tube in position. The said flaring base $D^2$ is provided with openings for the passage of the rods C C and the tube $A'$, which allow the chimney-tube to be put into position, as shown in Fig. 1; but these openings should be no larger than merely sufficient to permit their passage. At one side an opening is provided for the passage of the vaporizing-tube B, and at the opposite side an opening is fitted with a draft-pipe E, the inner end of which is arranged to come opposite the mixing-cup $B^0$ on the vaporizing-tube B for directing air to said cup, the outer end of said draft-pipe E being open and provided with deflector-plate $E^0$, which causes the air to enter the said pipe laterally and excludes snow and rain therefrom. This pipe is slotted at its inner end at $e$ and $e'$ to fit over the tube $B^3$ and the rod C and arched brace $B^5$, as seen in Figs. 1 and 4.

F represents a narrow annular ring which rests upon the conical base $D^2$ of the chimney-tube and supports the wider ring $F^0$, which has its lower edge provided with a series of arched notches $f^0$ for air-passages and secured at intervals between said notches, as at $f'$, to the said ring F, as seen most clearly in Fig. 3, or any other suitable support may be provided. The ring $F^0$ is connected to the chimney-tube D by means of a plurality of braces $f^3$, and so held rigidly to the said chimney-tube.

The oil-tank A is provided with a plurality of supporting-braces $A^3$, the curved ends $a^3$ of which engage over the upper edge of the ring $F^0$, which serves as a support for the said oil-tank. These supporting-arms are not, however, fastened in any way to the said ring $F^0$ and may be removed therefrom. A plurality of radial arms $F^4$ are rigidly mounted upon the ring $F^0$ and contact at their ends with the inner side of the annular oil-tank and serve merely as distance pieces or braces to prevent the displacement of the said tank.

H represents a cover or cap in the form of a truncated cone, at the apex of which is an opening $H^0$, surrounded by an annular flange $h^0$. Mounted upon this flange is an arched plate $H'$, open at both its ends, and inclosing this plate $H'$, at a short distance therefrom, so as to leave a free air-passage, is a second arched plate $H^2$, somewhat larger than the plate $H'$. Through these plates pass the supporting-rod $C^2$, which engages the cross-piece $C'$, mounted upon the supporting-rods C C, as hereinbefore described. The flange $h^0$, surrounding the opening in the apex of the cap H when the latter is in position, rests upon the upper ends of the rods C C, as shown in Fig. 1. The cap H is large enough to inclose and cover the tank and the vaporizing apparatus at the top of the lamp to protect the same from rain or snow.

A pair of concave plates $D^3\ D^3$, depending from opposite sides of the conical base $D^2$ of the chimney-tube, are provided to abut against the tubular standards $B^2$ and $B^3$ and give additional support to the said chimney-tube.

The globe of the lamp is indicated by dotted lines in Fig. 1 and marked O. This chimney rests upon a supporting-disk $O^2$, having a central opening surrounded by a cylindrical boss $o$, fitted with a thumb-screw $o'$, by which the said disk may be adjustably clamped upon the stem $O'$ and which allows the globe to be readily removed when desired.

$O^3\ O^3$ represent two draft-tubes fitted to openings in the disk $O^2$ and provided at their lower ends with swinging caps $e^3 e^3$, by means of which said tubes may be closed to shut off the draft.

The operation of my device will be apparent and need not be particularly referred to herein.

While I have described my invention as applied to a street-lamp particularly, I do not wish to be understood as limiting myself in the use of the same for any one single purpose.

Having thus described my invention, what I claim, and desire to secure by Letters Patent of the United States, is—

1. In a street-lamp, the combination with the burner and its supporting-frame; a vapor-tube and a vaporizing-tube forming part of said frame; an oil-tank mounted above said frame; a supply-pipe connecting said tank with said vaporizer; of a chimney-tube having a flaring conical base extending over said frame and resting thereon, the said tank surrounding said chimney-tube; a ring having a serrated bottom edge concentrically surrounding said chimney-tube; braces on said ring fixed to said chimney-tube; a narrow supporting-ring resting upon the base of said chimney-tube and secured to the bottom edge of said serrated ring; supporting-brackets rigidly mounted upon the said tank and bearing upon the upper edge of said serrated ring; and radial arms fixed upon said serrated ring having their ends abutting against the said tank, substantially as described.

2. In a street-lamp, the combination with the burner and its supporting-frame comprising as elements a vapor-tube and a vaporizing-tube; an annular tank mounted upon said frame; a supply-pipe connecting said tank with said vaporizer; of a chimney-tube having a flaring conical base extending over said frame and resting thereon, the said tank surrounding said chimney-tube; a ring having a serrated bottom edge concentrically surrounding said chimney-tube; braces on said ring fixed to said chimney-tube; supporting-brackets rigidly mounted upon the said tank and bearing upon the upper edge of said serrated ring; a pair of rods mounted upon said frame and extending upwardly therefrom; a hood supported upon said rods; and an eye-bolt attached to said hood, for suspending the lamp, substantially as described.

3. In a street-lamp, the combination with the burner and its supporting-frame; a vapor-tube and a vaporizing-tube constituting a part of said frame; an oil-tank mounted above said frame; a feed-pipe connecting the said tank with said vaporizing-tube; and a regulating-valve in said vaporizing-tube; of a chimney-tube having a flaring conical base extending over said vaporizing-tube and mounted upon said frame; a draft-tube leading laterally through the base of said chimney-tube to the mouth of said vaporizing-tube; a pair of rods rigidly mounted upon the said frame and extending upwardly therefrom; a hood supported upon said rods and extending over said tank and lamp-frame; and means for suspending the lamp, substantially as described.

4. In a street-lamp, the combination with the burner and its supporting-frame, the latter comprising as elements a vapor-tube and a tube extending across the burner; said pipe and tube being disconnected at their adjacent ends; an arched brace connected to said pipe and said tube; an oil-tank mounted above said frame; a feed-pipe connecting the said tank with said vaporizing-tube; and a regulating-valve in said vaporizing-tube; of a chimney-tube having a flaring conical base extending over said tube and the adjacent end of said feed-pipe; a draft-tube leading laterally through the base of said chimney-tube to the mouth of said vaporizing-tube; a pair of rods rigidly mounted upon the said frame and extending upwardly therefrom; a hood supported upon said rods; and means for suspending the lamp attached to said hood, substantially as described.

5. In a vapor-lamp, the combination with a closed liquid-tank having a small chamber formed therein provided with restricted circulating-passages, and having a filling-opening provided with an air-tight closure; of an outlet-pipe for the liquid communicating with said chamber, a valve for controlling the flow of liquid and a valve for admitting air to said tank and for retaining the same under pressure within said tank, substantially as described.

6. In a vapor-burning lamp, the combination with an annular liquid-tank provided with a filling-opening and means for closing the same against the passage of air; of an outlet-pipe connected with said annular tank and partitions fixed within the said tank upon opposite sides of and near the outlet-opening, said partitions being provided with small passages for restricting circulation of liquid through said partitions, substantially as described.

In testimony whereof I affix my signature in presence of two witnesses.

DAVID SHELDON RICE.

Witnesses:
FRANK D. BLACKISTONE,
JOHN CHALMERS WILSON.